(12) United States Patent
Lee

(10) Patent No.: US 7,203,160 B1
(45) Date of Patent: Apr. 10, 2007

(54) SYSTEM AND METHOD FOR CONTROLLING DUPLEXING IN AN ATM SWITCHING SYSTEM

(75) Inventor: Sang Ho Lee, Kyongki-do (KR)

(73) Assignee: LG-Nortel Co., Ltd., Seoul (KR)

( * ) Notice: Subject to any disclaimer, the term of this patent is extended or adjusted under 35 U.S.C. 154(b) by 756 days.

(21) Appl. No.: 09/666,054

(22) Filed: Sep. 20, 2000

(30) Foreign Application Priority Data

Sep. 21, 1999 (KR) ................................ 1999-40760

(51) Int. Cl.
*G01R 31/08* (2006.01)

(52) U.S. Cl. ...................... 370/218; 370/220; 370/227

(58) Field of Classification Search ........ 370/216–220, 370/473, 474, 225, 227; 379/221.03, 221.04, 379/279
See application file for complete search history.

(56) References Cited

U.S. PATENT DOCUMENTS

| | | | | |
|---|---|---|---|---|
| 5,274,633 A * | 12/1993 | Kato et al. | ................ | 370/219 |
| 5,301,184 A * | 4/1994 | Uriu et al. | ................ | 370/219 |
| 6,169,726 B1 * | 1/2001 | Dempsey et al. | ............ | 370/219 |
| 6,269,077 B1 * | 7/2001 | Matsumura et al. | ........ | 370/218 |
| 6,411,599 B1 * | 6/2002 | Blanc et al. | ................ | 370/219 |
| 6,567,376 B1 * | 5/2003 | Karlsson et al. | ............ | 370/216 |

* cited by examiner

*Primary Examiner*—Doris H. To
*Assistant Examiner*—Ian N. Moore
(74) *Attorney, Agent, or Firm*—Ked & Associates, LLP

(57) ABSTRACT

A duplexing control system and method of an ATM switching system capable of carrying out a stable switching of duplexing with a simple circuit construction is disclosed. The system has two boards respectively having a first interface matching with an input bus so as to interface received ATM cell, a second interface matching with an output bus so as to interface a transmitted ATM cell, an SAR for disassembling and assembling data units contained in an application layer in the transmitted/received ATM cell by a unit of ATM cell, a control section for controlling general operation in order to maintain the active state according to data processing information contained in a signal applied from the cell disassembling and assembling circuit, when the its own board is endowed with the active authority by the signal, and a DRAM for storing data transmitted/received for the switching of duplexing between the boards. The duplexing control system and method in an ATM system causes data processing information of one board and a duplexing authority to be formed into an ATM cell and to be transferred through a cell bus, so that a duplexing control can be stably carried out.

29 Claims, 2 Drawing Sheets

SYSTEM AND METHOD FOR CONTROLLING DUPLEXING IN AN ATM SWITCHING SYSTEM

BACKGROUND OF THE INVENTION

1. Field of the Invention

The present invention relates to an Asynchronous Transfer Mode (ATM) switching system, and more particularly to a system and method for controlling duplexing in an ATM system.

2. Background of the Related Art

In general, an ATM switching system uses an asynchronous transfer mode, in which user information is formed as a cell. The cell includes a five byte header sector including destination information for transmission the information, and a 48 byte payload sector including data information. The user information is transmitted through an output port using switching according to the information recorded in the header sector.

FIG. 1 is a schematic block diagram of a related art ATM switching system. As shown in FIG. 1, when an audio signal, a video signal, data, or the like, to be transmitted to a prescribed destination is inputted into an ATM multiplexer 1, the ATM multiplexer 1 forms a cell. The cell includes data information and destination information for the inputted signals. The ATM multiplexer transmits the cell to an ATM switch 2. Then, the ATM switch 2 switches an output port of a destination of transmission, based on the received header information of the cell, and outputs an output of the cell through the output port.

The ATM switching system, which transmits information by means of a cell as described above, includes two boards having the same construction. These boards are respectively maintained in an active state and in a standby state. Inter-processor communication (IPC) for exchanging information between processors is maintained between the processors of the two boards, so as to maintain stability and reliability in the transmission/reception of data.

In such an ATM switching system, when a first board in an active state is separated or the system experiences trouble, the first board executes a switching of duplexing procedure. By doing this, the first board transfers active authority and data information, which has already been processed by the first board to a second board, which is in a standby state. It does this through an IPC communication. When the trouble of the first board has been settled, the first board is maintained in the standby state.

FIG. 2 shows a schematic block diagram of a related art duplexing system, which can continuously operate an ATM switching system, even when a board is separated or the ATM switching system experiences trouble.

As shown in FIG. 2, each of boards A and B includes a high speed serial input/output (SIO) board A2 and B2 for rapidly transmitting/receiving information between the boards. Accordingly, when switching from Board A (the present board) to Board B (the opponent board) in order to transmit/receive state information between the boards having the duplexing construction and data processing information, data required in the SIO communication needs to be changed and restored (i.e. segmented and reassembled). This delays the receipt of information by the opponent board. It further results in a loss of the transmitted/received data in the course of processing it into data necessary in the SIO communication. Moreover, when the SIO board experiences trouble, the transmission/reception of information between the boards is not carried out, and normal switching of duplexing is thus not performed.

The above references are incorporated by reference herein where appropriate for appropriate teachings of additional or alternative details, features and/or technical background.

SUMMARY OF THE INVENTION

An object of the present invention is to substantially obviate the problems caused by disadvantages of the related art.

It is another object of the present invention to provide a system and method for controlling duplexing in an ATM system, in which state information can be transmitted/received between two boards having a duplexing construction through a pin-to-pin connection.

It is another object of the present invention to provide a system and method for controlling duplexing in an ATM system in which a board in an active state forms data information being processed by itself into an ATM cell and transfers the ATM cell together with an active authority to an opponent board through a common bus, so that a duplexing control can be stably performed without adding a separate hardware.

To achieve at least these objects in whole or in parts, there is provided a method for controlling duplexing in an ATM system, the ATM system including a plurality of duplexing control boards connected to an input/output bus and input/output ports for transmitting/receiving state information, the method comprising the steps of: determining at least a master board and at least a slave board from among the duplexing control boards; recognizing state information of an opponent board from information of the input/output ports connecting the master board and the slave board with each other, the duplexing control boards being respectively maintained in an active state and in a standby state; generating information for transferring an active authority, and forming data information presently being processed into ATM cell information, when a switching of duplexing of a board in the active state is necessary according to the state information recognized in the recognizing step; and performing the switching of duplexing according to the information and the ATM cell information.

To further achieve at least these objectives in whole or in parts, there is provided a system for controlling duplexing in an ATM system, the ATM system including a plurality of duplexing control boards connected to an input/output bus and input/output ports for transmitting/receiving state information, comprising a first interface means matching with an input bus so as to interface a received ATM cell; second interface means matching with an output bus so as to interface a transmitted ATM cell; cell disassembling and assembling means for disassembling and assembling data unit contained in an application layer in the transmitted/received ATM cell by a unit of ATM cell; control means for controlling general operation in order to maintain the active state according to data processing information contained in a signal applied from the cell disassembling and assembling means, when the its own board is endowed with the active authority by the signal; and memory means for storing data transmitted/received for the switching of duplexing between the boards.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
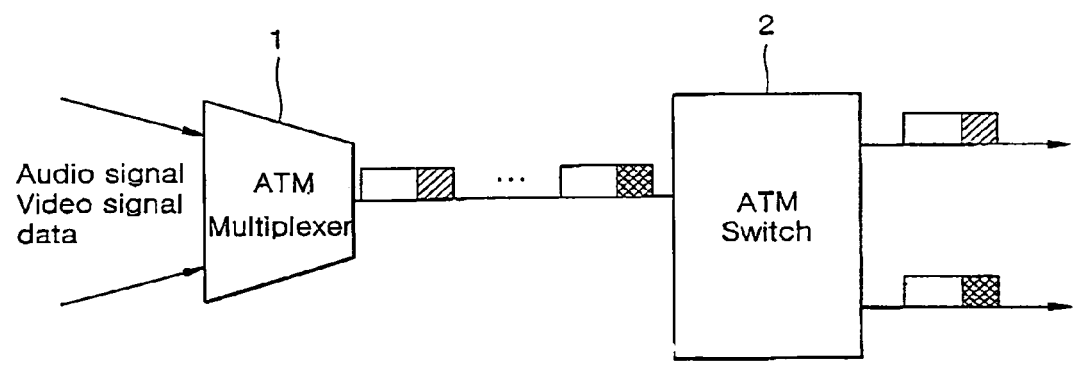
FIG. 1 is a schematic block diagram of a related art ATM switching system.
Figure 2:
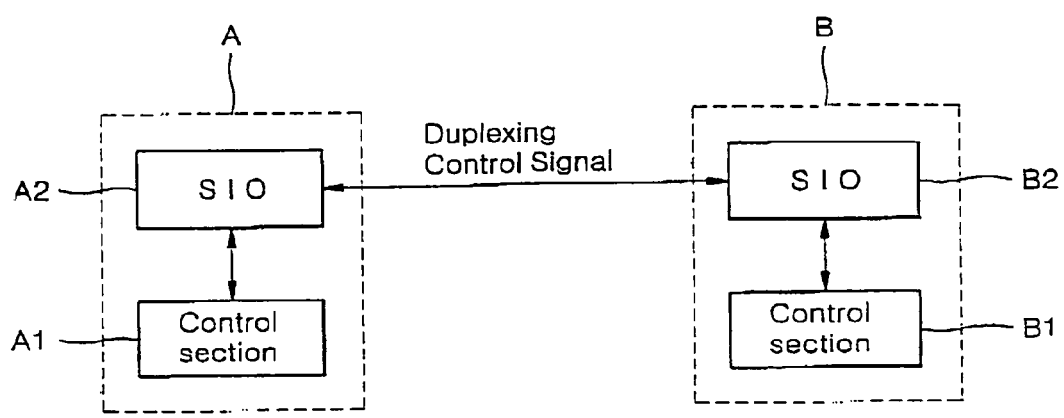
FIG. 2 is a schematic block diagram of a related art duplexing control system of the ATM switching system of FIG. 1.
Figure 3:
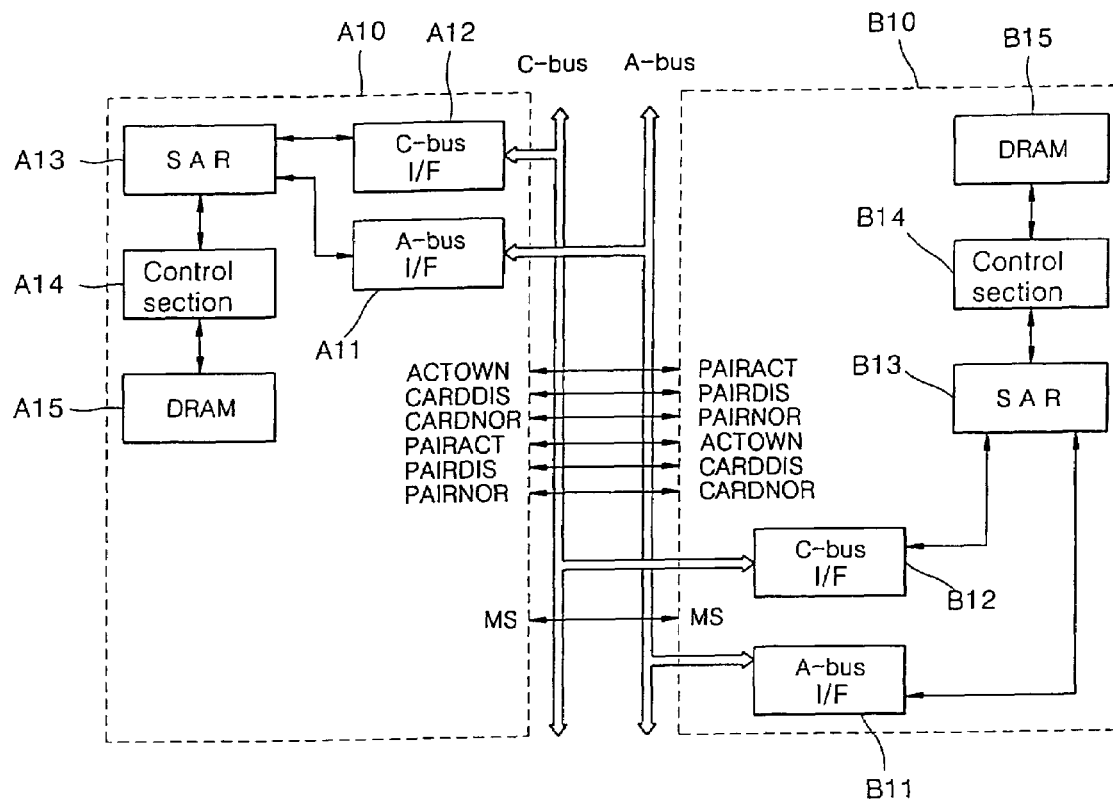
FIG. 3 is a schematic block diagram of a duplexing control system of an ATM switching system according to a preferred embodiment of the present invention.

Referring to FIG. 3, a duplexing control system of an ATM switching system according to a preferred embodiment of the present invention includes first and second duplexing control boards A10 and B10, which are respectively coupled to an input bus A-bus and an output bus C-bus. For purposes of clarity, whenever a board is receiving information from or otherwise probing another board, that board is sometimes referred to the present board, and the other board is referred to as the opponent board. The first and second boards A10 and B10 each respectively include a plurality of input/output ports, including ACTOWN, CARDDIS, CARDNOR, PAIRACT, PAIRDIS, PAIRNOR, and MS. Each of these ports is respectively connected to opponent ports, so as to transmit/receive state information between the boards A10 and B10.

Further, the boards A10 and B10 respectively include first and second A-bus interfaces A11 and B11, C-bus interfaces A12 and B12, segmentation and reassembly (SAR) sections A13 and B13, control sections A14 and B14, and DRAMs A15 and B15.

Each A-bus interface A11 and B11 preferably couples to the input bus A-bus to perform an interface of a received ATM cell. Each C-bus interface A12 and B12 preferably couples to the output bus C-bus so as to perform an interface of a transmitted ATM cell.

Each SAR section A13 or B13 preferably performs the functions of disassembling and assembling data units contained in an application layer, or transmitted/received data information in the transmitted/received ATM cell by the unit of cell.

Each control section A14 and B14 preferably detects data information of the opponent board, detected through the disassembling and assembling of the cell by the SAR A13 or B13. Then, when the present board has the active authority, the control section performs a control for maintaining the active state, and stores all information, which has been processed in the opponent board, in DRAM A15 or B15.

Each DRAM A15 and B15 stores data, which is received according to control signals applied from the control section A14 or B14, in designated addresses, and outputs corresponding data according to access requests of the control section A14 or B14.

As stated above, the input/output ports of the first and second boards A10 and B10 include ACTOWN, CARDDIS, CARDNOR, PAIRACT, PAIRDIS, PAIRNOR, and MS. These ports are used for transmitting/receiving state information between the boards. Each port will now be described.

The ACTOWN port is configured to inform the opponent board of the state of the present board, e.g. active state or standby state.

The PAIRACT port is coupled to the opponent ACTOWN port, and recognizes if the opponent board is in the active state or the standby state.

The PAIRDIS port is configured to output a signal to reset the opponent board.

The CARDDIS port is coupled to the opponent PAIRDIS port, and resets the present board when a reset signal is received from the PAIRDIS port.

The CARDNOR port is configured to transmit state information of the present board, e.g. whether it is in a normal state or an abnormal state, to the opponent board.

The PAIRNOR port is coupled to the opponent CARDNOR port, and recognizes the state information of the opponent board according to the signal received from the CARDNOR port.

The MS port provides information as to whether the present board is a master board or a slave board.

Figure 4:
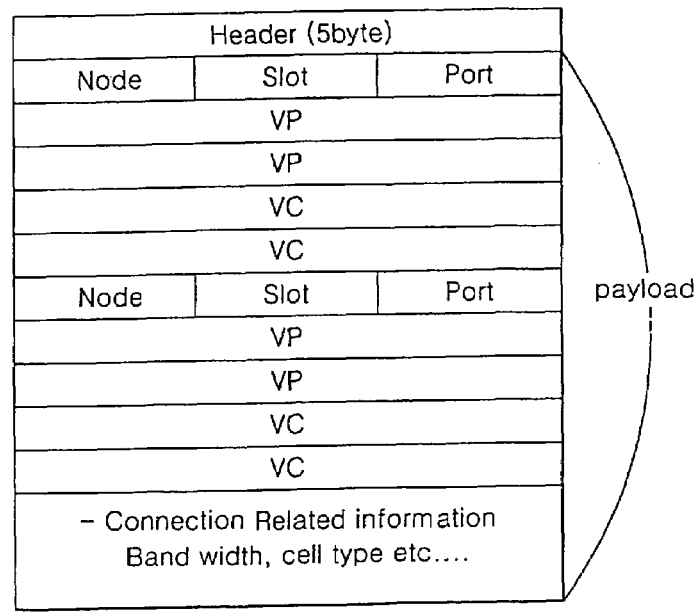
FIG. 4 is a constructional view of an ATM cell used to achieve duplexing control by the duplexing control system of the ATM switching system according to a preferred embodiment of the present invention.

FIG. 4 is a constructional view of an ATM cell transmitted/received through the input bus A-bus and the output bus C-bus. As shown in FIG. 4, the ATM cell preferably includes a header of five bytes, which indicates a destination of transmitted data. The ATM cell further includes a payload of 48 bytes containing data information.

The first connected side is indicated by the initial three bytes of the payload. Of these three bytes, two bits indicate node information, four bits indicate slot information, three bits indicate port information, and eight bits indicate information of a virtual channel (VC) and a virtual path (VP) for enabling switching between the boards by providing the state information. In the preferred embodiment, 16 boards may be employed in a bus. Also, a maximum of eight ports may be employed in a board, and 16 slots may form one node. A maximum of four nodes may be used.

The second three bytes in the payload indicate the other connected side, and have the same construction as that of the initial three bytes. The remaining bytes of the payload include information, such as a cell type or a bandwidth of the connection with the virtual path (VP) and virtual channel (VC), for example.

A duplexing control process by a duplexing control system of an ATM switching system according to a preferred embodiment of the present invention will now be described. First, a determination is made as to which of two boards, for example Board A and Board B, is a master board, and which is a slave board. This is preferably done by recognizing (i.e. analyzing) a MS signal of each board. Thus, where the board is mounted to a fixed pin of a BACKBOARD of the system, an MS of "1" (high) indicates a master board, and an MS of "0" (low) indicates a slave board. In this example, Board A is the master board and is initially in an active state and Board B is the slave board and is initially in a standby state.

If the active state of the master board is changed, that is, the master board cannot perform a normal operation, the CARDNOR signal of the master board is changed from "1" to "0". Meanwhile, the slave board periodically checks the PAIRACT signal and the PAIRNOR signal of the master board. When even one of the PAIRACT signal and the PAIRNOR signal becomes "0", the slave board converts the state of the PAIRDIS of the slave board from "0" to "1", so as to reset the master board, and switches the standby state of the ACTOWN and the CARDNOR to "1", so as to switch the state of the slave board into the active state.

Thereafter, the slave, which is now in the active state, switches the PAIRDIS signal to "0" as to release the reset of the master board. The master board then determines the state of the ACTOWN and the CARDNOR of the slave board (presently in the active state), and switches to the standby state when the state of the ACTOWN and the CARDNOR of the slave board is "1".

Switching of peripheral devices of the boards for the duplexing is thus carried out according to information of the VP and the VC, which is data of the payload in the ATM cell.

By way of example, assume that a condition is set, where VP:0 (LOW) and VC:255 are used when the master board forwards the cell and VP:1 (HIGH) and VC:255 are used when the slave board forwards the cell. When the master board is in the active state, the information is changed into the ATM cell in the master board (VP:0 and VC:255), and is then sent to the opponent slave board by the control section. When the ATM cell arrives at the slave board, the slave board confirms details of the cell, and includes corresponding information in the control information for the switching.

Next, when the slave board is in the active state, the information is changed into the ATM cell in the slave board (VP:1 and VC:255), and is then sent to the opponent master board by the control section. When the ATM cell arrives at the master board, the master board confirms details of the cell, and includes corresponding information in the control information for the switching.

When a corresponding cell is generated in the above process, it is recognized that there is a change in the connection. When the VP and the VC among the cell data are respectively 0 and 0, it is recognized that there is no change in the connection, but that there is a change in other information generated during the operation, such as update information or a software change, so that switching between boards is not performed.

When initialization of the system is performed, for example, by initially applying electric power to the boards, or applying a reset signal from the PAIRDIS port of the opponent board to the CARDDIS port of its own board, information of the MS port of the opponent board (backboard information of the system) is analyzed through the MS port of the present board. This is done to determine if the present board is the master board or the slave board. When it is the master board, the state of the opponent board is confirmed by analyzing information of the opponent board received through the input ports including the CARDDIS port, the PAIRACT port, and the PAIRNOR port.

In the preferred embodiment, when it is determined that the opponent board is not being maintained in the active state, the present board is determined to be in the active state. Thus, its own state (the active state) is reported to the opponent board through the ACTOWN port. Further, when the present board is determined to be in the active state as described above, and when the state of the opponent board, which is detected through the input ports of the present board (including the CARDDIS port, the PAIRACT port, and the PAIRNOR port), is a normal state, although it is not the active state, the control section A14 or B14 ascertains that the present board is processing data in an active state into cell information having the construction as shown in FIG. 4. This done through the SAR A13 or B13. The cell information is then transferred to the opponent board.

Further, when the board is mounted to slots for the first time and the mounted board is maintained in the slave state, the state of the opponent board is confirmed in the process as described above after waiting one-second. As a result of the confirmation, when it is determined that the opponent board is maintained in the active state, the present board is continuously maintained in the slave state. On the contrary, when it is determined that the opponent board is not in the active state, the present board is operated in the active state. This is done to inform the opponent board of the state information of the present board through the process as described above.

Moreover, when two boards for duplexing are simultaneously mounted to the slots, a board, which is not maintained in the active state, demands from the other (i.e. opponent) board, which is maintained in the active state, the state information of the opponent board through the ATM cell information having the construction as shown in FIG. 4. The opponent board maintained in the active state forms the present connection state of the opponent board into an ATM cell information as shown in FIG. 4 through the SAR A13 or B13, and transfers the ATM cell information to the requesting board.

Further, when the board, which is not in the active state, is mounted for the first time, it forms all present data into an ATM cell. That is, information in relation to the virtual channel and the virtual path of the connection is formed into an ATM cell as shown in FIG. 4. The board then transfers the ATM cell to the opponent board.

When an initialization of the board has been carried out for the various states described above, the ATM cell is transmitted/received through the input bus A-bus and the output bus C-bus. In this example, since the output bus C-bus is maintained in the active state, the ATM cell received in each board through the C-bus interface A12 or B12 is transmitted to the control section A14 or B14 through the SAR A13 or B13. Additionally, the control section of the board maintained in the active state processes the received data, while the control section of the board not maintained in the active state abandons the received data.

When a first board is maintained in an active state and a second board is maintained in a standby state as described above, and the board in the active state comes into an abnormal state, the second board in the standby state performs the duplexing operation. That is, the second board in the standby state sends a reset signal to the first board in the active state through the PAIRDIS port of the second board, so as to reset the first board (the board in the active state). The second board operates in the active state and reports a signal for its state to the opponent board.

As described above, the duplexing control system of an ATM switching system according to the present invention has many advantages. For example, the duplexing system detects state information between boards through pin-to-pin transmission/reception, and performs a switching of duplexing. When this occurs, the boards, which are respectively in an active state and in a standby state, respectively recognize their changed states through ports. They then form data information to be processed into an ATM cell and transfer the ATM cell through a cell bus to the board endowed with an active authority. Therefore, the duplexing control system of an ATM switching system according to the preferred embodiment of the present invention can carry out a stable switching of duplexing. Moreover, it has a simple circuit construction since a separate board does not have to be installed in the system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports, wherein the state information is provided to each of the first and second boards through the input/output ports connecting the first board to the second board;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the ATM cell information, wherein the ATM cell information comprises a virtual path and a virtual channel, and wherein the virtual path is 0 and the virtual channel is 0 when there is no change to the active and standby states between the first and second boards, and change to update information or software occurs during an operation of the ATM system.

2. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports, the input/output ports connecting the first and second boards by bypassing the input/output bus;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the generated information in the form ATM cell information, wherein a state of an MS port determines whether a board is the first board or the second board when the board is mounted to pins of a backboard of the ATM system.

3. The method of claim 1, wherein a recognition of and a conversion between the active state and the standby state are carried out by recognizing a state of each board.

4. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the generated information in the form ATM cell information, wherein the ATM cell comprises a header to indicate a destination of transmitted data and a payload containing data information, the payload having first and second three bytes segments, in which two bits indicate node information, four bits indicate slot information, three bits indicate port information, and eight bits indicate virtual channel and virtual path information.

5. The method of claim 1, wherein the virtual path is 0 and the virtual channel is 255 when the first board is in the active state, and wherein the virtual path is 1 and the virtual channel is 255 when the second board is in the active state.

6. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the generated information in the form ATM cell information, wherein a CARDNOR signal is changed from "1" to "0" when the first board cannot perform a normal operation, and wherein the second board converts a state of a PAIRDIS of the second board to "1", to reset the first board and switch the state of the second board into the active state, when one of a PAIRACT signal and a PAIRNOR signal of the first board becomes "0" so as to transfer the active authority from the first board to the second board for the switching of duplexing.

7. The method of claim 6, wherein the second board switches the state of the PAIRDIS to "0" to release the reset of the first board after the second board is converted into the active state, and sets the master board to the standby state when the state of a ACTOWN signal and a CARDNOR signal of the second board is "1".

8. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the generated information in the form ATM cell information, wherein information of an MS port of the second board is analyzed through an MS port of the first board, and when the second board is in the standby state, the active state of the first board is recognized and reported through an ACTOWN port to the second board upon an initialization of the system.

9. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports, the input/output ports connecting the first and second boards by bypassing the input/output bus;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the generated information in the form ATM cell information, wherein the state of the first board is confirmed when the second board is initially mounted to slots and is maintained in the standby state, and the second board maintains its standby state when the first board is in the active state, and wherein the second board is operated in the active state and informs the first board of its state through an ACTOWN port when the master board is in the standby state.

10. A method for controlling duplexing in an ATM system, the ATM system including a plurality of duplexing control boards, each of the plurality of boards coupled to an input/output bus and having a plurality of input/output ports for transmitting/receiving state information, comprising:

monitoring state information of first and second boards using the plurality of input/output ports, the input/output ports connecting the first and second boards by bypassing the input/output bus;

determining an active or standby state of each of the first and second boards according to the monitored state information;

generating information to transfer an active authority to the second board, and forming presently processed data of the first board into ATM cell information, when the second board is required to assume the active state; and switching the duplexing to the second board according to the generated information in the form ATM cell information, wherein, when two duplexing boards are mounted to slots, a first board, which is not maintained in the active state, requests state information from a second board maintained in the active state through the ATM cell information, and wherein the second board in the active state forms state information of the second board into an ATM cell information, and transfers the ATM cell information to the first board.

11. A system for controlling duplexing in an ATM system, the ATM system including a plurality of duplexing control boards connected to an input/output bus, comprising:

a first interface circuit configured to couple with an input bus to interface a received ATM cell;

a second interface circuit configured to couple with an output bus to interface a transmitted ATM cell;

a cell disassembling and assembling circuit to disassemble and assemble a data unit contained in an application layer in the transmitted/received ATM cell by a unit of ATM cell;

a control circuit detect a signal from the cell disassembling and assembling circuit, wherein the control circuit maintains an active state when a first board is provided active authority by the signal;

a plurality of input/output ports to transmit/receive state information; and a memory to store data transmitted/received for the switching of duplexing between the boards, wherein the plurality of input/output ports comprise:

an ACTOWN port to inform a second board of information as to whether a first board maintains the active state or the standby state;

a PAIRACT port coupled to the ACTOWN port, to recognize if the second board is maintained in the active state or the standby state;

a PAIRDIS port to output a signal to reset the second board;

a CARDDIS port coupled to the PAIRDIS port, the CARDDIS port resetting the first board when a reset signal is applied from the PAIRDIS port;

a CARDNOR port to transmit information as to whether the first board is currently maintained in a normal state or in an abnormal state, to the second board;

a PAIRNOR port coupled to the CARDNOR port, the PAIRNOR port recognizing state information of the second board according to a signal received from the CARDNOR port; and an MS port having information as to whether the first board is a master board or a slave board.

12. The system of claim 11, wherein the first interface circuit comprises an A-bus interface.

13. The system of claim 11, wherein the second interface circuit comprises a C-bus interface.

14. The method of claim 1, wherein the first board is a master board and the second board is a slave board.

15. The method of claim 1, wherein the state information determines when the second board is required to assume the active state.

16. The method of claim 2, wherein the state of the MS port is determined when the board is mounted to pins of a backboard of the ATM system.

17. A method of controlling duplexing, comprising:

recognizing state information of a first and second duplexing control board by monitoring a plurality of input/output ports on each of the first and second duplexing control boards, wherein the state information is provided to each of the first and second boards through the input/output ports connecting the first and second duplexing control board;

forming transfer commands to transfer active authority from one of the first and second control boards to the other control board;

forming ATM cell information from data presently being processed in an active one of the first and second control boards; and switching the active authority from one of the first and second control boards to the other control board based on the ATM cell information, wherein the ATM cell information comprises a virtual path and a virtual channel, and wherein the virtual path is 0 and the virtual channel is 0 when not switching the active authority and when updating information or changing software during an operation of the first and second control boards.

18. A duplexing control circuit, comprising:

an interface circuit to couple to an input/output bus;

a control circuit to maintain an active state of the duplexing control circuit based on ATM cell data and state information; and a plurality of input/output ports to transmit state information of the duplexing control circuit, and receive state information from at least one other duplexing control circuit, wherein the state information is provided to each of the duplexing control circuit and the at least one other duplexing control circuit through the input/output ports coupling the duplexing control circuit and the at least one other duplexing control circuit, wherein the duplexing control circuit monitors state information of at least one other duplexing control circuit, and where a state of the duplexing control circuit and the at least one other duplexing control circuit is one of an active state and a standby state determined by a virtual path and a virtual channel indicated by the state information.

19. The circuit of claim 18, wherein the state of the duplexing control circuit is one of an active state and a standby state, and wherein the duplexing control circuit monitors state information of at least one other duplexing control circuit.

20. A method for controlling duplexing in an ATM system, the ATM system including a plurality of duplexing control boards connected to an input/output bus and input/output ports for transmitting/receiving state information, comprising:
   determining at least one master board and at least one slave board from among the plurality duplexing control boards;
   recognizing state information of an opponent board from information of the input/output ports connecting the master board to the slave board, the duplexing control boards being respectively maintained in an active state and a standby state, wherein the state information is provided to each of the master board and the slave board through the input/output ports connecting the master board and the slave board;
   generating information to transfer an active authority, and forming data information presently being processed into ATM cell information, when a switching of duplexing of a board in the active state is necessary according to the recognized state information; and
   switching the duplexing according to the generated information and the formed ATM cell information, wherein the ATM cell information comprises a virtual path and a virtual channel, and wherein the virtual path is 0 and the virtual channel is 0 when the active authority is not being transferred and when updating information or changing software during an operation of the ATM system.

21. An ATM system, comprising:
   a slave board;
   a master board; and
   a number of signal lines connecting ports on the master board and slave board,
   wherein the signal lines carry state information for switching duplexing between the boards, wherein the state information indicates a virtual path and a virtual channel for determining an active state and a standby state of the slave board and the master board, and wherein the signal lines connecting the ports on the master board and slave board bypass a bus carrying ATM cell data for the board, and wherein the master board includes:
   a first port to inform the slave board of whether the master board is in the active state or standby state;
   a second port to receive information from the slave board indicating whether the slave board is in the active or standby state;
   a third port to output a reset signal to the slave board; and
   a fourth port to receive a reset signal from the slave board for resetting the master board.

22. The system of claim 21, wherein the number of signal lines is more than one.

23. The system of claim 21, wherein the reset signal is received from the slave board when the master board switches to the standby state.

24. The system of claim 21, wherein the slave and master boards each include:
   a memory which stores the state information; and
   a controller which controls a duplexing state based on the state information.

25. The system of claim 24, wherein, in each board, the controller updates the state information stored in the memory to indicate a current duplexing state of the board.

26. The system of claim 24, wherein the controller of the slave board monitors changes in state information stored in the memory of the master board.

27. A duplexing control method in an ATM system, comprising:
   receiving state information of a master board;
   storing the state information in a memory of a slave board; and
   switching a duplexing state of the slave board based on the state information,
   wherein the state information indicates a virtual path and a virtual channel for determining the duplexing state and wherein the state information is transmitted through pin-to-pin connections between the master and slave boards, said pin-to-pin connections bypassing a bus which is coupled to the master and slave boards for carrying ATM cell information, wherein said connections include:
   a first connection to inform the slave board of whether the master board is in the active state or standby state;
   a second connection to receive information from the slave board indicating whether the slave board is in the active or standby state;
   a third connection to output a reset signal to the slave board; and
   a fourth connection to receive a reset signal from the slave board for resetting the master board.

28. The method of claim 27, wherein the duplexing state is one of an active state and a standby state.

29. The method of claim 27, further comprising:
   transmitting the reset signal from the slave board to the master board through said fourth connection when the state information indicates the master board has entered a standby state.

* * * * *